Dec. 11, 1962 A. ORNER 3,067,933

CARD PROCESSING APPARATUS

Filed April 10, 1959 3 Sheets-Sheet 1

INVENTOR:
Allan Orner
By Smyth & Roston
Attorneys

Dec. 11, 1962 A. ORNER 3,067,933

CARD PROCESSING APPARATUS

Filed April 10, 1959 3 Sheets-Sheet 2

INVENTOR:
Allan Orner
By Smyth & Roston
Attorneys

Dec. 11, 1962 A. ORNER 3,067,933

CARD PROCESSING APPARATUS

Filed April 10, 1959 3 Sheets-Sheet 3

INVENTOR:
Allan Orner

By Smyth & Roston

Attorneys 3,067,933

CARD PROCESSING APPARATUS

Allan Orner, Los Angeles, Calif., assignor to The Magnavox Company, Los Angeles, Calif., a corporation of Delaware Filed Apr. 10, 1959, Ser. No. 805,430
25 Claims. (Cl. 235—61.11)

Figure 1:
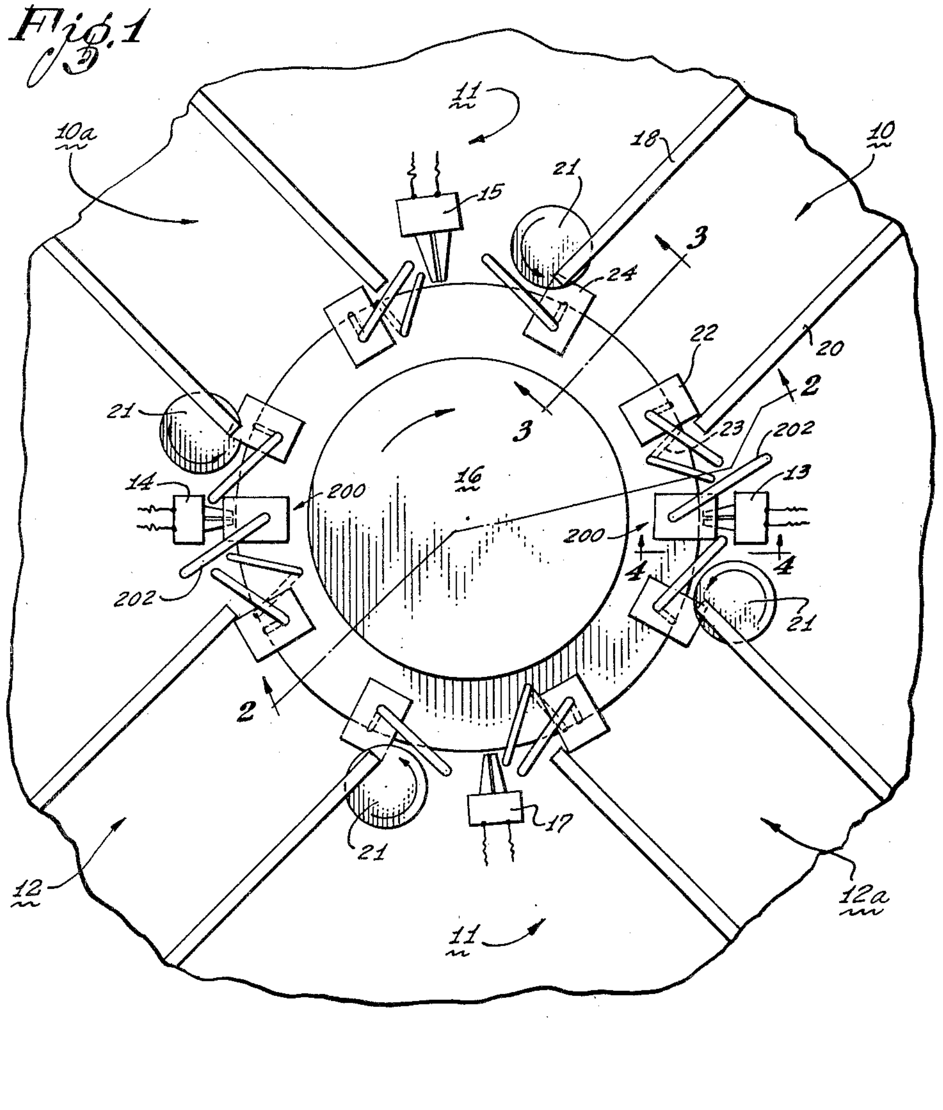

The present invention relates to improved apparatus for handling information storage elements, such as cards, on which data is recorded. The invention is more particularly concerned with an improved concept relative to card transport means, card holders, card transfer gates and other mechanisms for use in such apparatus.

In one general type of data processing system, the data stored in the system is recorded on a plurality of individual information storage cards. The term "cards" is intended generically to cover a plurality of different types of discrete elements, such as plates, panels, boards, and the like. The information may be recorded on the cards in the form of patterns of holes, in the form of magnetic areas of one polarity or another, in the form of black and white areas or in any other form. Suitable transducers are then provided at reading or writing stations for sensing the information on the cards or for writing new information on them.

When hole patterns are used, the transducers referred to above may be mechanical, optical or electrical. These transducers cause the presence or absence of a hole to be sensed for any particular area of each card. Likewise, when magnetic recording is used, it is usual to provide electro-magnetic transducers for processing the cards. Furthermore, electro-optical transducers may be provided for sensing the different areas on the cards when, for example, black and white areas are used as a recording technique.

Different types of systems and apparatus have been proposed for handling the information storage cards and for transporting the cards past appropriate transducers for processing. A most successful type of apparatus of this general type utilizes rotatable vacuum pressure drums. Such apparatus may be used for selecting, merging, sorting, collating and otherwise processing the information storage cards.

In apparatus of the general type referred to in the preceding paragraph, the cards are selectively fed to the peripheral surface of a transport drum from a card feeding station positioned adjacent the drum. A vacuum pressure is provided at the peripheral surface of the drum to hold the cards on the drum, and the drum is rotated to obtain a movement of the cards with the drum. The cards to fed to the transport drum are carried in succession by the drum from the feeding stations to other stations for processing.

The vacuum pressure rotatable transport drum may be used either alone, or in conjunction with other similar drums, to carry the cards in succession past the transducers at the reading or writing stations for processing the cards. This processing, for example, may establish certain sorting controls, and the cards may be selectively transferred to other transport drums under the action of these controls. These other drums may then carry the cards to different stationary stacking stations into which the cards are deposited.

Each of the vacuum pressure rotatable transport drums referred to above is equipped with peripheral orifices, and air is drawn inwardly through these orifices and downwardly through the hollow interior of the drum to create a vacuum pressure at the peripheral surface of the drum. This vacuum pressure enables the cards to be firmly retained on the peripheral surface of the drum for circulation from one station to another.

The present invention is concerned with apparatus which may, in some embodiments, be similar to the apparatus described in the preceding paragraph. In the apparatus of the invention, the transport means (which may be one or more rotatable vacuum pressure drums) is constructed so that its actual width is less than the widths of the cards to be carried by it. This means that a portion of the back face of each card on the transport means is exposed. Such exposure permits stationary apparatus to be mounted externally of the transport means and in a position to exert an influence on the backs of the cards carried by the transport means. As will become more apparent subsequently, this structure simplifies to a large extent the handling of the cards with respect to their transfer from feeding stations to the transport means, their transfer from one transport means to another and their transfer from a transport means into a stacking station.

Copending application 742,546, now Patent No. 3,016,239, filed June 17, 1958 in the name of Alfred M. Nelson et al., discloses a reversible card feeding-stacking station which is intended to be used in conjunction with a transport means, such as a rotatable vacuum pressure drum. The station of the copending case is controllable to permit a controlled transfer of the cards to the transport means when the mechanism is in a first operating mode, and to cause a deposit of the cards from the transport means into the station when the mechanism is in a second operating mode. The station of the copending application is also constructed to permit certain cards to be carried past its mouth by the transport means in a "pass under" manner, instead of being deposited in the station.

As pointed out in the copending application, the station mentioned above is advantageous because it permits simplification in many card processing mechanisms. For example, a plurality of such stations positioned adjacent a single drum, in the manner described in the copending application, permits sorting, merging and collating of the cards, and without the need for additional drums and extraneous transfer mechanisms.

The concepts of the present invention may be utilized to provide an improved and simplified "pass under" reversible feed-stack station of the type mentioned above. As will be described in detail in the present specification, the station constructed in accordance with the concepts of the present invention may incorporate stationary vacuum pressure units positioned at the mouth of the station externally of the transport means. These units are positioned to exert a controlled vacuum pressure force on the back of the cards transported by the transport means to the mouth of the station. As will be described in detail, this control on the backs of the cards may be such to control the feed of cards from the station to the transport means, to control the feed of cards from the transport means to the station, and to permit cards to "pass under" the mouth of the station.

As noted above, it is often desirable in systems and apparatus of the type under discussion to use a plurality of vacuum pressure transport drums in a system, and to cause the information cards to be controllably and selectively transferred from one drum to another. For example, when it is desired to select a card bearing certain desired data from a stack of information storage cards in a feeding station, all the cards from the feeding station may be successively fed to a first rotatable vacuum pressure transport drum to be transported on that drum past one or more transducer heads. These transducer heads identify data, or other information, on successive cards until the desired card is reached. After each card other than the desired card is read by the transducer heads, it may be circulated, for example, on the first drum to an appropriate stacking station. When the desired card is reached, however, the resulting control signals may be used to cause the card to be transferred to a second drum for further processing.

Automatically controlled gate mechanisms are known for effecting a transfer of information storage cards in a selective manner from one transport drum to another for reasons such as those described in the preceding paragraph. Copending application Serial No. 566,404, now Patent No. 3,023,894, for example, describes and claims apparatus in which mechanically pivotable gates are used for obtaining such a transfer of information storage cards from one rotatable transport drum to another. Other types of gate transfer mechanisms of this type are disclosed in copending application Serial No. 614,686, now Patent No. 2,985,299, filed October 8, 1956 in the name of Jerome B. Wiener; and in copending application 730,102, now Patent No. 2,906,503, filed April 22, 1958 in the name of Eric Azari et al.

The concepts of the present invention may further be utilized to provide an improved and simplified gate transfer mechanism of the type described in the preceding paragraphs, and which may be used to obtain a transfer of the cards from one transport medium to another. For effectuating such a transfer in accordance with the present invention, pressurized air jets may be positioned at the point of adjacency of the two transport media, with the jets being directed at the protruding backs of the cards carried by the transport means. The jets may be controlled to effect a selective transfer of the cards, if so desired.

The above discussion is directed at but two typical examples in which the concepts of the present invention may be embodied. Similar modifications to other card handling mechanisms may also be achieved by applying the teachings of the invention. Some of these additional mechanisms will be described in the following specification.

Figures 2, 7:
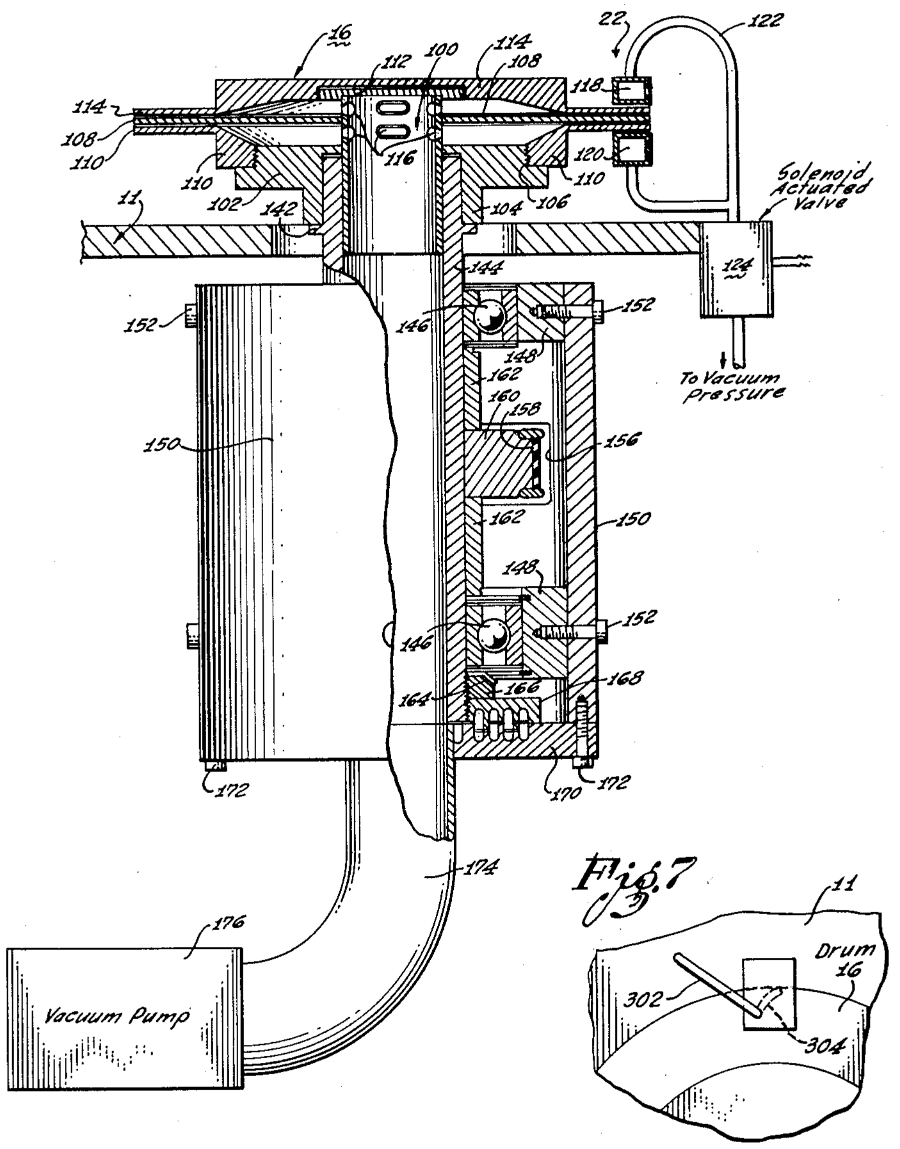
Figures 3, 4:
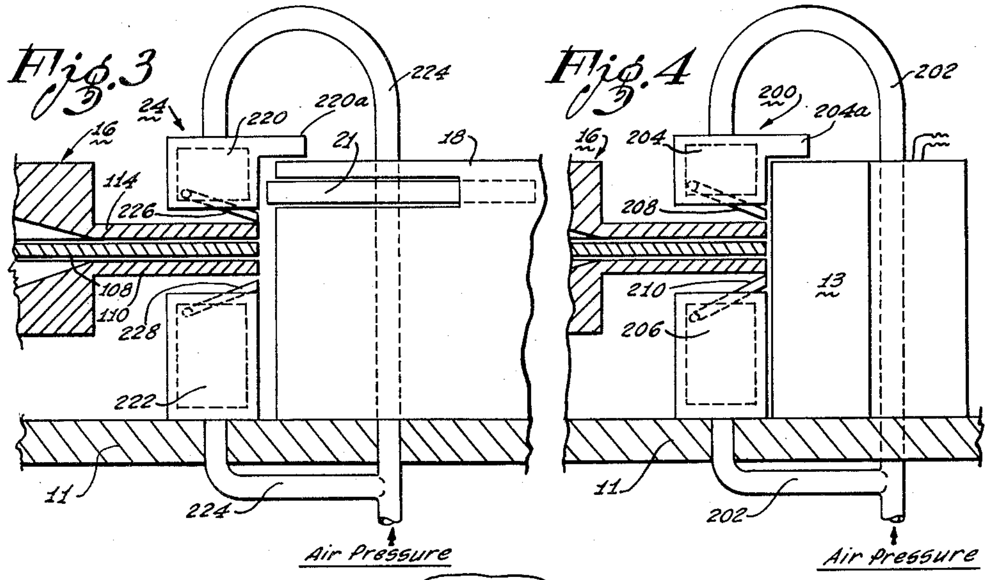
Figures 5, 6:
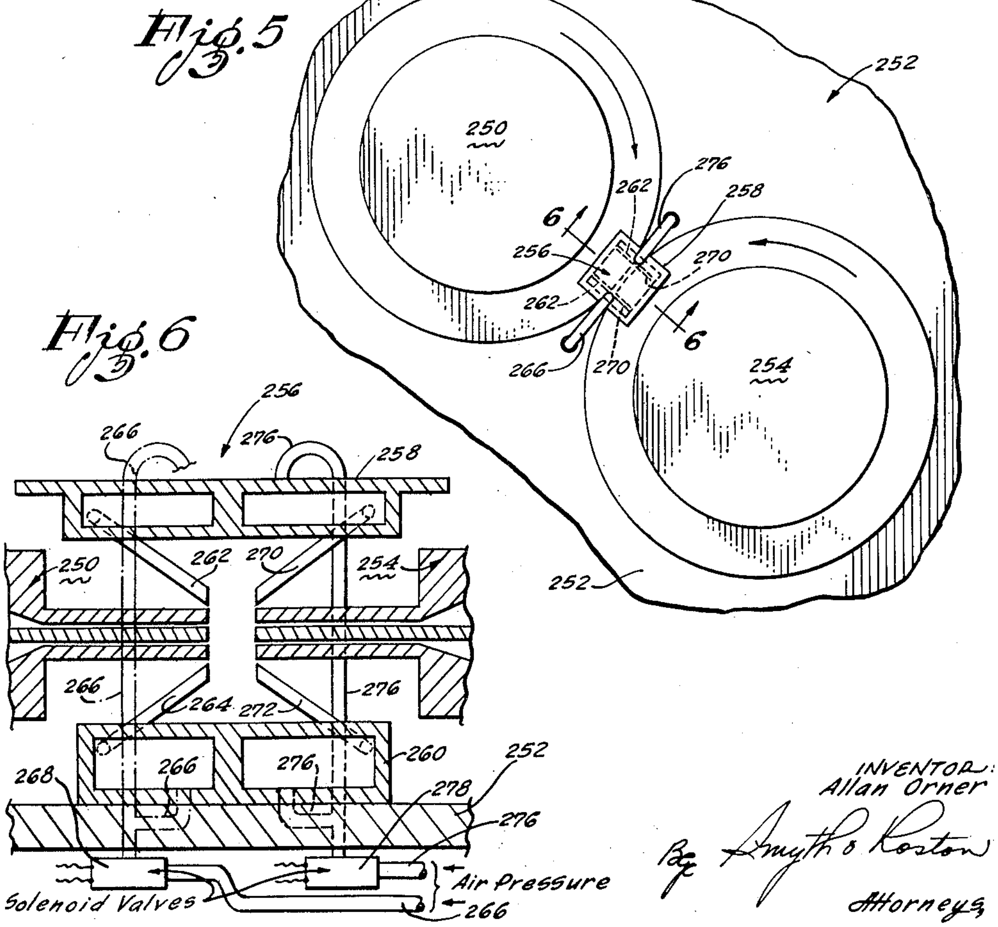

In the drawings:

FIGURE 1 is a top plan view of a card processing apparatus which is constructed to incorporate the concepts of the present invention, the illustrated apparatus including a rotatable vacuum pressure transport drum which is constructed to have a width less than the width of the cards transported on its peripheral surface; the illustrated apparatus also including a group of four reversible feeding-stacking stations positioned with their mouths adjacent the periphery of the drum, and with suitable mechanisms positioned at the mouths for acting on the backs of the cards carried by the drum to control the feed of cards out of the different stations and the deposit of the cards into the different stations;

FIGURE 2 is a sectional view of the apparatus substantially on the line 2—2 of FIGURE 1, this latter view being intended primarily to show the constructional details of the rotatable vacuum transport drum included in the apparatus, and also to show the manner in which stationary pneumatic card holding mechanisms may be positioned externally of the drum to exert forces on the backs of the cards carried by the drum;

FIGURE 3 is a view of the apparatus, partly in section, taken substantially along the line 3—3 of FIGURE 1, and illustrating a stationary pick-off member which is positioned externally of the drum at the mouth of one of the feeding-stacking stations, and which member includes a plurality of pressurized air jets which direct streams of air at the backs of the cards transported by the transport drum to the mouth of the corresponding station so as to facilitate the deposit of cards into the station;

FIGURE 4 is a fragmentary side elevational view of the apparatus, partly in section, taken substantially on the line 4—4 in FIGURE 1, this latter view illustrating a transducer head, and the manner in which the teaching of the present invention may be applied to cause the cards transported past the transducer heads to be brought into intimate contact with the head for accurate processing;

FIGURE 5 is a top plan view of a second type of apparatus for processing information storage cards, the latter apparatus including a pair of rotatable transport drums constructed in accordance with the invention, and the latter apparatus also including a transfer gate mechanism which also incorporates the concepts of the invention and which serves to control the transfer of the cards from one of the drums to another;

FIGURE 6 is a sectional view of the apparatus substantially on the line 6—6 of FIGURE 5 to illustrate the constructional details of the gate transfer mechanism, and the positioning of suitable pressurized air jets which control the transfer of the cards between the two transport drums; and FIGURE 7 is a fragmentary view of a modification of the invention.

With reference to the apparatus of FIGURE 1, a rotatable vacuum pressure transport drum 16 is mounted on a table top 11. Although a rotatable drum is shown and disclosed in detail, it should be appreciated that any suitable type of transport means may be used and that such transport means may even be stationary. The transport means such as the drum 10 are constructed to obtain a movement of cards. It should be appreciated, as noted above, that the term "cards" is intended to cover any type of discrete elements capable of recording and reproducing a plurality of bits of information. Preferably, the cards may be constructed to record and reproduce information in magnetic form.

The drum 16 is constructed, as will be described, to exert a vacuum pressure at its peripheral surface. This vacuum pressure serves to retain the information cards firmly on that surface in fixed angular positions so that the cards may be transported by the drum from one station to another. The construction and operation of the transport drum 16 will be described in detail subsequently. It is sufficient at this point to state that the width of the drum is less than the width of the cards transported by it. Therefore, portions of the back surfaces of the cards extend axially beyond the confines of the drum to permit operational controls to be exerted against those portions of the cards.

A first reversible card feeding-stacking station designated as 10 is mounted on the table top 11 with its mouth in contiguous relationship with the peripheral edge of the drum 16. A second reversible feeding-stacking station, which is designated generally as 12, is also mounted on the table top 11 and is positioned diametrically opposite to the station 10. The feeding-stacking station 12 also has its mouth disposed in contiguous relationship to the drum 16.

The drum 16 is illustrated as rotating in a clockwise direction. It should be understood, however, as the description proceeds that other types of movable or stationary card transport means can be utilized.

In like manner, a reversible card feeding-stacking station 10*a* is positioned on the table top 11 to have its mouth adjacent to the drum 16, the station 10*a* being located between the stations 10 and 12. A fourth card feeding-stacking station 12*a* is also positioned on the table top 11 with its mouth adjacent the periphery of the drum 16. The station 12*a* may be positioned diametrically opposite to the station 10*a*.

A first transducer means 13 is mounted on the table top 11, and this transducer means is positioned between the stations 10 and 12a. A second transducer means 14 may also be mounted on the table top 11 on the opposite side of the vacuum transporting drum 16 from the transducer means 13 and between the stations 12 and 10a. The transducer means 13 and 14 may be any suitable and well known type of electro-magnetic transducer head, or plurality of heads, when magnetic recordings are used. For example, these transducer means may be constructed in a manner similar to the reading-writing heads described in copending application Serial No. 550,296, filed December 1, 1956 in the name of Alfred M. Nelson et al.

Each of the transducer means 13 and 14 may include a plurality of heads, as noted, and each head may be positioned to process a different row of magnetic areas on the cards transported past the heads by the drum 16. At least one of these rows may include information identifying the different cards and one head in each of the transducing means 13 and 14 may be used to scan the card-identifying row and develop card-identifying signals.

A second pair of transducer means 15 and 17 may also be provided. The latter transducing means may each consist of a single head positioned to scan the card-identifying row and thereby generate card-identifying signals. The transducing means 15 is positioned adjacent the trailing wall of the station 10*a*, and the transducing means 17 is positioned adjacent the trailing wall 9 of the station 12*a*.

The feeding-stacking station 10, for example, has a leading wall 18 and a trailing wall 20 with respect to the rotation of the drum 16. These walls are fixed to the table top 11 in parallel relationship, and they extend outwardly from the periphery of the drum 16. The walls 18 and 20 are spaced apart a distance corresponding essentially to the length of the cards used in the apparatus. These cards are supported in stacked relationship in the station 10 between the walls 18 and 20 in an upright position with their lower edges resting on the table top. A rotatable wheel 21 is positioned adjacent the leading wall 18, and this wheel rotates in a counterclockwise direction to assist the feed of cards into the station 10 and out of the station 10. The details of such rotatable assist wheel are fully discussed in copending application Serial No. 764,066, now Patent No. 2,983,507, filed September 29, 1958, in the name of Eric Azari et al.

A vacuum pressure unit 22 which will be described in further detail in conjunction with FIGURE 2, is positioned adjacent the mouth of the station 10 near the trailing wall 20. A nozzle 23 is positioned adjacent the unit 22, between that unit and the trailing wall 20 of the station. The nozzle 23 is operated in unison with the unit 22 to emit a set of pressurized fluid whenever the unit 22 exhibits a vacuum pressure. The end of the wall 20 forms a throat with the periphery of the drum 16. When the vacuum pressure to the unit 22 is interrupted, the pressure jet from the nozzle 23 is also interrupted, and the cards from the station 10 may be fed in a one-by-one sequence from the station 10 and onto the periphery of the drum 16. The read head 13 is positioned to read card identifying information on each released card before the trailing edge of such a card clears the unit 22.

A second unit 24 is also positioned adjacent the drum 16 externally of the drum and near the leading wall 18 and assist wheel 21 of the station 10. This latter unit is controlled to emit pressurized air jets against the backs of the cards transported by the drum 16 to the mouth of the station 10. These air jets cause the trailing edge of a card arrested at the mouth of the station 10 to be moved outwardly from the periphery of the drum 16. This permits the following card to pass under the preceding card and to pry it away from the unit 22 to cause the preceding card to be deposited in proper order in the station 10. A mechanical pick-off such as described in the copending application Serial No. 742,546, now Patent No. 3,016,239, may be used in place of the unit 24 to fulfill the same purpose.

When the station 10 has cards deposited in it, and when that station is to be conditioned to a feeding mode, the pressurized jets 24 may be de-activated. The vacuum pressure at the unit 22 is controlled in such a manner that when the vacuum pressure is interrupted, the pressurized jet from the nozzle 23 is also interrupted, and the leading card in the station passes through the throat at the end of the wall 20 and onto the periphery of the drum 16. The released card then has its identifying information read by the appropriate head of the transducer means 13. This enables a decision to be made as to whether the vacuum pressure from the unit 22 is to be re-established to seize the next card and prevent it from being carried out of the station until the vacuum pressure is again interrupted; or whether the vacuum pressure is to remain off to permit one or more of the following cards in the station 10 to be fed in a one-by-one sequence to the periphery of the drum 16. If the vacuum pressure is to be re-established, the pressurized jet from the nozzle 23 is also re-established. This jet forces the leading edges of the succeeding cards in the station 10 back away from the feed throat. This action prevents the succeeding cards from becoming wedged in the feed throat.

The station 10 may incorporate a suitable resiliently biased pusher member for holding the cards in a stacked position and for urging the cards towards the mouth of the station. Such a pusher member is disclosed, for example, in copending application Serial No. 717,270, now Patent No. 3,001,897, filed February 24, 1958, in the name of Eric Azari et al.

When it is desired to condition the station 10 to a stacking mode, the pick-off jets 24 may be re-activated, and the vacuum at the unit 22 is provided together with the pressurized jet from the nozzle 23. Then, when a card is transported on the drum 16 to the mouth of the station 10, the vacuum pressure exerted at its back face by the unit 22 causes the card to be arrested at the mouth of the station 10. The jet from the nozzle 23 moves the leading edge of the arrested card back away from the feed throat. At the same time, the pressurized jets from the pick-off 24 extend against the back face of the rear end of the card to cause the trailing end to move outwardly from the periphery of the drum 16. The next card transported by the drum to the mouth of the station 10 then passes under the trailing end of the previously arrested card and moves under the previous card and over the unit 22, so that it too is arrested by the unit 22 and its leading edge is urged back from the feed throat by the jet from the nozzle 23. The previous card is then deposited into the station 10 and the next card takes its place as the lead card. In this manner, one card after another may be transported by the drum 16 to the mouth of the station 10 to be deposited in the station.

When it is desired to have any particular card pass under the mouth of the station 10, the vacuum pressure at the unit 22 is interrupted, as is the jet from the nozzle 23, after that card has been arrested. The interruption of the vacuum pressure is long enough to permit the arrested card to be released and move through the throat and back onto the transport drum 16. The vacuum pressure is then re-established upon processing of the card by the particular head of the transducing means 13 before the next card has a chance to be fed out of the station 10. The particular head is positioned to read the card identifying information on the released card before its trailing edge has cleared the vacuum pressure unit. This provides enough time to build up sufficient vacuum pressure at the unit 22 to hold the next card, if it is to be held.

Likewise, the jet from the nozzle 23 is activated before the released card clears that nozzle to enable sufficient pressure to be built up in the jet to keep the leading edge of the next card out of the feed throat after the released card has passed through the throat.

The other stations may have similar controls to those discussed in detail in conjunction with the station 10. When in the feeding mode of operation, the reversible station 10 may contain a plurality of information storage cards in stacked relationship. In that mode of operation, the station 10 is conditioned to feed cards controllably to the periphery of the drum 16. The station 12 may be empty under these conditions, and it may be conditioned to a stacking mode. The cards from the station 10 may now be controllably fed to the periphery of the transport drum 16 and transported by the drum past the transducer means 13 for processing. After processing of the cards by the transducer means 13, the cards may be deposited in the station 12*a* by activating the components associated with that station. Alternatively, any of the cards may pass under the station 12*a* by the controls described above, so as to enable selected ones of the cards to be stacked in other stations such as the station 12.

At the completion of the processing operation, the operational modes of the reversible stations may be reversed so that the cards may be returned to the station 10*a*. The cards may be further processed by the transducer means 14 during this return. The return of the cards to the station 10*a* will now be effectuated by conditioning the station 10*a* to its stacking mode, as described above. Also, selected ones of the cards may be caused to pass under the station 10*a* and be deposited, for example, in the station 10.

In each instance, the feed of cards from any one of the feeding-stacking stations is controlled by the particular one of the heads or transducer means 13, 14, 15 and 17 associated with that station and in the manner described above in conjunction with the station 10.

As noted above, this ability of the reversible feeding-stacking stations of the present invention to enable cards selectively to be passed under certain stations by the drum 16 greatly facilitates the use of the stations in systems which perform sorting and other operations and in which different cards are to be deposited in different stations. The system of FIGURE 1 is, of course, intended merely to illustrate certain operational applications of the concepts of the invention.

As shown in FIGURE 2, the drum 16 includes a central hollow hub 100. A lower annular collar 102 is fixed to the hub 100, and this hub includes a portion 104 which extends downwardly in coaxial relationship with the hub 100 but spaced from the hub. The collar 102 also has a threaded portion 106 which has a diameter less than the extreme diameter of the collar to form a shoulder with a portion of the collar.

The hub also has an annular member 108 fixed to it, the annular member being spaced axially from the collar 102 and having a diameter greater than the diameter of the collar. The annular member 108 has a peripheral surface which forms a portion of the part of the drum which carries the cards. A second annular member 110 is threaded to the threaded portion of the collar 102 and is supported by the shoulder of the collar referred to above. The annular member 102 has a portion which extends outwardly with the annular member 108 in spaced relationship with the member 108 so that an air passage is defined between the members 108 and 110. The outer peripheral surface of the member 110 also forms a portion of the drum which actually carries the cards.

A disc-like member 112 is mounted on the top of the hub 100, and the outer rim of the disc 112 is threaded to receive a second disc-like member 114. The disc-like member 114 is spaced axially above the disc 108 and extends outwardly so that peripheral surface of the member 114 also forms a portion of the drum which actually carries the cards. Likewise, an air space is formed between the disc-like members 114 and 108. The hub 100 has apertures 116 formed in it to complete an air passage from the peripheral edge of the drum to the hollow interior of the hub 100.

The peripheral edges of the three members 114, 108 and 110 form an annular peripheral track on which the cards are supported. In a manner to be described, air is drawn inwardly through the spaces between these members to create a vacuum pressure at the peripheral track so as to retain the cards firmly on the drum. As mentioned previously, the width of the resulting peripheral track is less than the width of the cards carried by the drum, so that portions of the card protrude upwardly and downwardly from the track to expose the back of each card.

The vacuum pressure unit 22 may have the configuration illustrated in FIGURE 2. This unit has a first compartment 118 and a second compartment 120. A feed line 122 has branches which extend to both the compartments 118 and 120, and the feed line 122 or, preferably, more rigid support brackets (not shown) serve to support the compartments above and below the drum 16 in the illustrated position. These stationary compartments are positioned adjacent the peripheral track of the drum so as to exert a vacuum pressure on the backs of the cards through the illustrated loop formed by the line 122, as the cards are transported by the drum.

The stationary vacuum pressure compartments 118 and 120 may have faces formed of rubber, or other high friction material, which normally would contact the cards transported by the drum through the loop formed by the line 22. Also, these compartments include orifices which extend through those faces so that a vacuum pressure may be exerted on the cards. A solenoid-actuated valve 124 is interposed in the line 122, and the line is coupled to any appropriate source of vacuum pressure. The valve 124 is operated by suitable logic circuitry, so that a vacuum pressure may be exerted on the back of a selected card transported to the mouth of the station 10 in the manner described in conjunction with FIGURE 1.

The portion 104 of the collar 102 fits on a shoulder 142 provided at the end of a hollow shaft 144, and this portion 104 has a friction fit with the end of the hollow shaft 144. Likewise, the hub 100 extends down into the upper end of the shaft 144 in friction fit with the latter shaft. Therefore, rotation of the hollow shaft 144 causes the drum 16 to rotate. Also, the interior of the shaft 144 communicates through the hollow hub 100 and through the opening 116 with the air passages which extend to the peripheral tracks of the drum.

Bearings 146 are provided at opposite ends of the shaft 144. The inner races of the bearings 146 are mounted on the shaft 144, and the outer races of the bearings are disposed against bushing 148 secured to a housing 150 as by studs 152. An arcuate opening 156 is provided in the housing 150 between the bearings 146. This opening enables a drive belt 158 to extend into the housing and round a pulley 160. The pulley 160 is keyed to the shaft 144 between the bearings 146, and it is held against axial movement by sleeves 162 positioned on the shaft between the bearings and the pulley. In this way, the shaft 144 and the drum 16 can be rotated by a suitable motor (not shown) coupled to the pulley 160 by the drive belt 158.

The bearings 146 and the sleeves 162 are held against axial movement on the shaft 144 by a nut 166. The nut 166 is screwed on a threaded portion at the bottom of the shaft and is maintained in fixed position on the shaft by a lock washer 164. A sealing disc 168 is also screwed on the threaded portion at the bottom of the shaft 144. The sealing disc 168 operates in conjunction with a bottom plate 170 to inhibit the movement of air between the interior of the housing 150 and the interior of the hollow shaft 144 when a difference of pressure exists between the housing and the shaft.

The bottom plate 170 is secured to the housing 150 by a plurality of studs 172 and is provided with a central opening. A hollow conduit 174 extends into the opening in friction fit with the plate 170. The conduit 174 is axially aligned with the hollow shaft 144 so that air may be exhausted from the hollow interiors of the shaft and of the conduit by a vacuum pump 176. The vacuum pump may be of any suitable known construction and for that reason is shown in block form in FIGURE 3.

The vacuum pump 176 draws air inwardly through the passages between the members 114, 108 and 110 and through the interior of the drum 16 and downwardly through the hub 100 and through the shaft 144 to the conduit 174. The air is then drawn inwardly through the conduit 174 to create a vacuum pressure at the outer peripheral track of the drum. The resulting vacuum pressure around the peripheral track of the drum serves to firmly retain the cards on the surface of that track.

As stated in conjunction with FIGURE 1, the cards transported from the stations are carried by the drum past the transducer means 13 or past the transducer means 14. Each of these transducer means is illustrated as being associated with a unit such as the unit 200 in FIGURE 1. This unit is shown in more detail in FIGURE 4. As illustrated in FIGURE 4, a feed line 202 extends to an upper stationary compartment 204 and to a lower stationary compartment 206, these two compartments making up the unit 200 of FIGURE 1.

The stationary compartment 204 is supported by the line 200 (or by suitable brackets) above the annular peripheral track of the drum 16, and the stationary compartment 206 is supported on the table top 11 below the peripheral track of the drum. The feed line 202 extends through the table top 11 to a suitable source of pressurized fluid, such as compressed air. A first plurality of nozzles 208 extend from the compartment 204 to a position adjacent the periphery of the drum 16 so as to emit streams of pressurized fluid to the backs of cards carried on the periphery to the head 13. A similar plurality of nozzles 210 extend from the compartment 206 to emit streams of pressurized fluid at the backs of the portions of the cards which extend downwardly from the peripheral track of the drum. The compartment 204 also has a portion **204*a* which extends over the top of the head 13 and which forms an appropriate guide for the cards as they are transported by the drum into the vicinity of the head. The pressurized fluid emitted by the jets 208 and 210 exerts just enough pressure to break the vacuum forces exerted by the drum and to form an air cushion between the cards and the drum. This air cushion brings the cards into intimate contact with the face of the head 13** for accurate reading of the cards as they are successively transported past the head by the drum.

As will be apparent, the information processed by the transducer means 13 and 14 may be used to control the operation of the various control members such as the gate transfer means shown in FIGURE 5. For example, when the transducing means 13 and 14 read a binary "1" at a particular position on each transported card, the gate transfer means shown in FIGURE 3 may be actuated to obtain a transfer of the cards from one of the drums shown in FIGURE 5 to the other drum shown in that figure. Upon the occurrence of a binary "0" at the selected position, the gate transfer means may not be actuated such that the card continues its movement on the same drum.

As illustrated in FIGURE 3, the pick-off member 24 described in conjunction with FIGURE 1 includes an upper stationary compartment 220 and a lower stationary compartment 222. A feed line 224 extends to the compartments 220 and 222 and couples these compartments to an appropriate source of pressurized fluid, such as a source of compressed air.

The stationary compartment 220 is supported by the feed line (or by appropriate brackets) above the drum 16 adjacent its peripheral track, and this compartment has a portion **220*a* which serves as a guide for limiting the upper position of the cards. The compartment 220 has a plurality of jets 226, which extend from it into the vicinity of the peripheral track of the drum 16** so as to exert a force against the backs of the cards which extend upwardly from that track.

In like manner, the stationary compartment 222 has a plurality of jets 228 which extend from it to the vicinity of the peripheral track of the drum 16. These latter jets exert a force against the backs of the portion of the cards which protrudes downwardly from the peripheral track of the drum 16.

Therefore, in the manner described, the air pressure exerted by the jets 226 and 228 causes the trailing end of a card arrested by the unit 220 to be moved outwardly from the peripheral surface of the drum 16 so as to enable a succeeding card to move between the drum and the preceding card. This permits the succeeding card to strip the preceding card from the drum and from the unit 22 and thereby deposit the preceding card in the station 10.

As indicated previously, under certain conditions it is desirable to provide a plurality of transport drums, each similar to the drum 16, for example, and to provide for the transfer of cards from one of these drums to another. Apparatus for performing such a function is illustrated in FIGURES 5 and 6. As shown in FIGURE 5, a first vacuum pressure drum 250 is rotatably mounted on a table top 252 for clockwise rotation on the table top. A second drum 254 is also rotatably mounted on the table top 252 for counterclockwise rotational movement on the table top. The drums 250 and 254 are mounted to be adjacent one another. Each of these drums may have the same constructional details as the drum 16, which was described in detail in conjunction with FIGURE 2. Moreover, each of the drums 250 and 254 may have one or more stations, such as the stations 10, **10*a*, 12 and 12*a* of FIGURE 1 mounted on the table top 252** and associated with the respective drums.

The concepts of the present invention may be utilized to provide a convenient gate transfer mechanism in conjunction with the drums 250 and 254 to provide for the controlled transfer of the cards from the drum 254 to the drum 250, and vice versa. Such a transfer mechanism is indicated at 256. This mechanism includes an upper stationary compartment 258 which also serves as a guide for the cards, and it includes a lower stationary compartment 260.

The upper and lower compartments both serve as guides for the cards to bring the cards into proper position so that a transfer may be effectuated. The upper stationary compartment 258 is supported above the drums by suitable brackets (not shown), and the lower stationary compartment 260 is supported on the table top 12 below the drums. A first plurality of jets extend from the compartment 258 to points above and adjacent the peripheral track of the drum 250, these jets being designated as 262. Similarly, a first plurality of jets 264 extend from the lower compartment 260 to points adjacent the periphery of the drum 250 but below the peripheral track of the drum.

A feed line 266 is coupled through a first section of the compartment 258 to the jets 262 and through a first section of the compartment 260 to the jets 264. This line extends to a suitable source of pressurized fluid, such as a source of compressed air. A solenoid actuated valve 268 is interposed in the line 266. When this valve is actuated, the jets 262 and 264 are caused to emit streams of the pressurized fluid. These streams are directed at the upper and lower portions of each card transported by the drum 250 to the point of adjacency of that drum with the drum 254. The jets have sufficient strength to overcome the vacuum pressure exerted on the cards by the drum 250, so that the cards are forced off the drum 250 and against the peripheral surface of the drum 254. During this transfer, the guiding portions of the compartments 258 and 260 assure that the cards will be properly guided from the peripheral surface of the drum 250 to the peripheral surface of the drum 254. Therefore, by the appropriate actuation of the solenoid valve 268, any selected card may be transferred from the drum 250 to the drum 254.

The compartment 258 has a second plurality of jets 270 which extend from a second section of the compartment to points adjacent the peripheral surface of the drum 254 and above the drum. Likewise, the compartment 260 has a plurality of jets 272 which extend from a second section of that compartment to points underneath the drum 254 and adjacent its peripheral surface. A feed line 276 couples the jets 270 and 272 through the second sections of the compartments 258 and 260 to a suitable source of pressurized fluid. A solenoid valve 278 is interposed in the feed line 276. Whenever the solenoid valve 278 is actuated, the jets 270 and 272 are caused to emit streams of pressurized fluid. These latter streams, similar to the manner described above, are directed to obtain a controlled transfer of cards from the drum 254 to the drum 250.

The invention provides, therefore, improved apparatus for handling information storage cards. In accordance with the concept of the present invention, the transporting means is provided with a width less than the transported cards, and various types of mechanisms are provided adjacent the transporting means for exerting an influence on the backs of the card. The resulting mechanisms provide, in the manner described, for the convenient transfer of cards from the transporting means into a stacking station, for the transfer of cards out of a feeding station to the transporting means, for the movement of cards into intimate contact with a read or write transducer means, and for the transfer of cards from one transporting means to another. Other mechanisms utilizing these concepts will also be readily apparent to those skilled in the art.

As a particular example in the stacking, feeding and passing of cards into, out of, or past a station, such as the station 10, the following particular example may be considered. Assuming first that the drum 16 has a peripheral speed of 300 inches per second, 1 millisecond is equivalent to .3 inch along the periphery of the drum. Assuming also that the cards have a length of 3 inches, this is equivalent to 10 milliseconds in length. As described above, the station 10 includes a pick-off bridge 24, a vacuum stack unit 22, a feed throat formed by the end of the wall 20 and the periphery of the drum 16, and a sensing transducer head (such as the head 13). The control of the unit 22 may be such that the cards are pulsed out of the station 10 at a rate which will leave a 9 millisecond gap on either side of each card.

In stacking a card, the cards entering the station 10 pass over the pick-off bridge 24 and, in the described manner, replace the leading card in the station which was previously held in place by the vacuum pressure at the unit 22. Since the previous leading card is no longer in contact with the drum, it is moved back into the station 10. Then, as successive cards are carried by the transport member 16 to the mouth of the station, they cause the preceding card in each instance to be stripped from the drum and moved back into the station.

In order to feed a card from the station 10 to the transport drum 16, the valve 124 of FIGURE 2 is closed to remove the vacuum force from the leading edge of the leading card. This allows the drum to carry the leading card through the lead throat and toward the sensing transducer head 13. The distance between the feed throat and the sensing head 13 may be such that the opening of the valve 124 is controlled by the released card. If the released card determines that the following card is not to be released, the valve 124 is closed before the trailing edge of the released card leaves the face of the unit 22. By the time the trailing edge of that card has left the face of the unit 22, sufficient vacuum pressure is established to hold the next card in the station 10.

As noted above, in the particular example, a 9 millisecond gap exists on either side of the cards being fed to the station 10. If any one of these cards is to be passed by the station 10, such a card passes over the pick-off bridge 24 and is stopped by the unit 22, as in the stacking mode. Previous to the entrance of that card to the station, however, the read head transducer 14 has already determined that this card must be passed. Therefore, approximately 4 milliseconds after it is stopped, the card is released as in the feeding mode of operation and by the control of the valve 124 in FIGURE 2.

In the embodiment of the invention disclosed in conjunction with FIGURES 3, 4 and 6, for example, the pressurized air jets are directed from the backs of the cards in an essentially perpendicular direction to the rear surface of each card. However, and as shown in FIGURE 7, the jets may be directed at the rear surfaces of the cards at other directions, such as in a direction essentially tangential to the periphery of the drum.

This view of FIGURE 7 shows, for example, a first stationary compartment 300 supported by a line 302 (or by suitable brackets) above the annular peripheral track of the drum 16, and a second stationary compartment (not shown) is supported under the compartment 300 on the table top 11 below the peripheral track of the drum. The feed line 302 extends through the table top 11 to a suitable source of pressurized fluid, such as compressed air.

A first plurality of nozzles, such as the nozzle 304 extend from the compartment 300 to a position adjacent the periphery of the drum 16. These nozzles are shaped to direct streams of pressurized fluid at the backs of the cards carried on the periphery of the drum in a direction essentially tangential to the periphery. A similar plurality of nozzles (not shown) extend from the second compartment which, likewise, serve to direct streams of pressurized fluid at the backs of the cards in a direction tangential to the periphery of the drum.

As described, therefore, the invention provides a convenient means for causing cards to be stacked in any one of the stations associated with the drum, to be passed under any selected station, or to be fed from a station to the drum. The invention also provides convenient means which include, for example, means for causing the cards to be transferred from one drum to another and to be moved into intimate contact with the transducing means.

I claim:

1. An apparatus for processing data on a plurality of information storage elements, the combination of: transport means constructed to obtain a movement of the elements with at least a portion of the element surfaces facing the transport means being in an exposed condition, and means positioned externally of the transport means in contiguous and physically separated relationship to said exposed portion of the facing surfaces of the transported elements for exerting a fluid force against the elements to control the movements of the elements.

2. In apparatus for processing data on a plurality of information storage cards, the combination of: transport means constructed to obtain a movement of the cards with at least a portion of the card surfaces facing the transport means having an overlapping relationship with respect to the transport means, and means disposed externally of the transport means in contiguous and physically separated relationship to the overlapping portion of the facing surfaces of the transported cards for acting on the cards to vary the movements of the cards.

3. In apparatus for processing data on a plurality of information storage cards, the combination of: transport means constructed to obtain a movement of the cards with a portion of one face of the carried cards being adjacent a transporting surface of the transport means and with at least one further portion of said face projecting from said transporting surface, and pneumatic means disposed in contiguous relationship to the projecting portion of the cards on the transport means to direct fluid in a direction having a major component perpendicular to the direction of movement of the transported cards for a control over such movements of the cards.

4. In apparatus for processing data on a plurality of information storage cards, the combination of: movable transport means constructed to carry the cards along a particular path in accordance with the movements of the transport means and with a portion of one face of the cards being in contact with a surface of the transport means and with at least one further portion of said face projecting from said transport means on at least one side of the particular path, and pneumatic means disposed externally of the transport means on one side of the particular path and in a position contiguous to said further portion of the cards transported by the transport means to impose a pneumatic force on the cards for controlling the movements of the cards.

5. In apparatus for processing data on a plurality of information storage cards, the combination of: a rotatable vacuum pressure transport drum constructed to carry the cards on its peripheral surface around an annular path, said drum having an axial width less than the width of the transported cards so that a portion of one face of the carried cards engages the peripheral surface of the transport drum and at least one further portion of said face projects axially from said transport drum on at least one side of the annular path, and stationary pneumatic means disposed externally of the transport drum on one side of the annular path and at a position contiguous to said further portion of said face of the cards transported by the transport means to exert a pneumatic force on the cards for controlling the movements of the cards.

6. The combination defined in claim 5 in which the pneumatic means directs air under pressure at said further portion of said face of the cards transported by the transport means.

7. The combination defined in claim 5 and in which the pneumatic means exerts a vacuum pressure on said further portion of said face of the cards transported by the transport means.

8. In apparatus for processing data on a plurality of information storage cards, the combination of: transport means constructed to obtain a movement of the cards with a portion of one face of the carried cards being contiguous to the transport means and with at least one further portion of said face of the carried cards projecting from said transport means, means disposed externally of the transport means and adjacent said further portion of said face of the transported cards for imposing a fluid force on the cards to control the movements of the cards, and means including a valve coupled to the fluid means for controlling the introduction of fluid to the fluid means in accordance with the actuation of the valve.

9. The combination set forth in claim 8 in which means including transducing means are disposed in coupled relationship to the cards on the transport means to control the actuation of the valve in accordance with the processing of information on the transported cards.

10. In apparatus for processing data on a plurality of information storage cards, the combination of: transport means constructed to obtain a movement of the cards with a portion of one face of the carried cards being adjacent the transport means and with at least one further portion of said face projecting from said transport means, stationary pneumatic means disposed externally of the transport means at a position contiguous to said further portion of said face of the transported cards to exert a vacuum pressure against said further portion, and means including a valve coupled to the pneumatic means for controlling the introduction of a vacuum pressure to the pneumatic means.

11. In apparatus for processing data on a plurality of information storage cards, the combination of: a card holder constructed to hold the cards in a stacked relationship, transport means positioned in coupled relationship with the card holder and constructed to provide a movement of cards towards the card holder for transfer into the card holder and for providing a movement of cards away from the card holder upon a transfer of cards from the card holder to the transport means, the transport means being constructed to carry the cards with a portion of one face of the carried cards disposed in contiguous relationship to the transport means and with at least one further portion of said face projecting from said transport means, and means disposed externally of the transport means and adjacent said further portion of said face of each of the transported cards for imposing a fluid force on the cards to obtain a controlled transfer of cards between the card holder and the transport means.

12. In apparatus for processing data on a plurality of information storage cards, the combination of: transport means constructed to obtain a movement of the cards with a portion of one face of the transported cards being adjacent the transport means and with at least one further portion of said face projecting from said transport means, a card holder constructed to hold the cards in a stacked relationship and positioned with the mouth thereof in coupled relationship with the transport means to obtain a transfer of cards between the transport means and the card holder, pneumatic means disposed externally of the transport means at the mouth of said card holder and adjacent said further portion of said face of individual ones of the transported cards for imposing a pneumatic force on the cards to obtain a controlled transfer of cards between the card holder and the transport means, valve means coupled to the pneumatic means for controlling the production of the pneumatic force by said pneumatic means in accordance with the actuation of the valve means, and transducer means coupled to the valve means for processing particular information on the transported cards to control the actuation of the valve means in accordance with such processed information.

13. In apparatus for processing data on a plurality of information storage cards, the combination of: transport means constructed to obtain a movement of the cards with a portion of one face of the transported cards being adjacent the transport means and with at least one further portion of said face of the transported cards overlapping said transport means, a card holder constructed to hold the cards in a stacked relationship and positioned with the mouth thereof in coupled relationship with the transport means for obtaining a transfer of cards from the transport means and a transfer of cards to the transport means, first pneumatic means disposed externally of the transport means at the mouth of said card holder and adjacent said transport means in a position to exert a pneumatic force on said overlapping portion of the face of each transported card, and means coupled to said first pneumatic means for controlling the production of a pneumatic force by said pneumatic means on said cards to control the transfer of the cards between the card holder and the transport means.

14. The combination defined in claim 13 and which includes second pneumatic means mounted externally of the transport means at the mouth of said card holder and adjacent said transport means in a position to exert a pneumatic means on the overlapping portion of said face of each transported card, and which further includes means coupled to said second pneumatic means for controlling the production of a pneumatic force by said second pneumatic means on said cards to control the transfer of the cards between the transport means and the card holder, and in which the first pneumatic means is disposed near the leading ends of the cards in the card holder to control the transfer of cards from the card holder to the transport means and in which the second pneumatic means is disposed near the trailing ends of the cards in the card holder to control the transfer of cards from the transport means to the card holder.

15. In apparatus for processing data on a plurality of information storage cards, the combination of: transport means constructed to obtain a movement of the cards with a portion of one face of the transported cards being adjacent the transport means and with at least one further portion of said face projecting from said transporting surface, transducer means positioned relative to the cards on the transport means for processing the signal indications on the cards as the same move past the transducer means, the transducer means being constructed to provide an enhanced processing of the signal indications on the cards upon the disposition of the cards against the transducer means, pneumatic means disposed externally of the transport means and opposite the transducer means and adjacent said further portion of said face of each of the transported cards, and means coupled to the pneumatic means for introducing fluid under pressure to the pneumatic means to cause the cards transported past the transducer means to be moved outwardly from the transport means and against the transducer means to facilitate the transducing action by the transducer means on the cards.

16. In apparatus for processing data on a plurality of information storage cards, the combination of: first transport means constructed to obtain a movement of the cards with a portion of one face of the carried cards being adjacent the first transport means and with at least one further portion of said face projecting from said transporting surface, second transport means constructed to obtain a movement of the cards and positioned adjacent the first transport means, means disposed externally of the first transport means and adjacent said first and second transport means and adjacent said further portion of said face of the transported cards for imposing a fluid force on the cards to obtain a transfer of the cards between the first transport means and the second transport means, and means coupled to the fluid means for controlling the introduction of fluid to the fluid under pressure to said fluid means to obtain a controlled transfer of cards between the first transport means and the second transport means.

17. In apparatus for processing data on a plurality of information storage cards, the combination of: transport means constructed to obtain a movement of the cards with a portion of one face of the cards carried by the transport means being adjacent the transport means and with at least one further portion of said face of the transported cards overlapping the transport means, a card feeding-stacking station having a mouth and constructed to hold the cards in a stacked relationship and positioned with the mouth thereof in coupled relationship with the transport means, first pneumatic means disposed near the leading ends of the cards in the feeding-stacking station to control the transfer of cards from the feeding-stacking station to the transport means, and means for controlling the production of a vacuum force by said first pneumatic means on said cards to control the transfer of cards between the station and the transport means and between the transport means and the station.

18. In apparatus for processing data on a plurality of information storage cards, the combination of: transport means constructed to obtain a movement of the cards with a portion of one face of the cards carried by the transport means being adjacent the transport means and with at least one further portion of said face of the transported cards overlapping the transport means, a card feeding-stacking station having a mouth and further having a leading wall and a trailing wall with respect to the movement of cards by the transport means, said trailing wall defining a feed throat with the transport means, said station being constructed to hold the cards in a stacked relationship and positioned with the mouth thereof in coupled relationship with the transport means, first pneumatic means disposed near the trailing wall of the feeding-stacking station, and means for controlling the production of a vacuum force by said first pneumatic means on said cards to control the transfer of cards between the station and the transport means and between the transport means and the station.

19. The combination defined in claim 18 and which includes second pneumatic means disposed between the first pneumatic means and the trailing wall of the station, and means for controlling the production of a jet of pressurized fluid by the second pneumatic means in unison with the production of the vacuum force by the first pneumatic means, the jet of pressurized fluid serving to move the leading ends of the cards in the station back from said feed throat.

20. In apparatus for processing data on a plurality of information storage cards, the combination of: transport means for the cards, receiving means constructed to receive cards from the transport means, and means disposed externally of the transport means and disposed in spaced relationship to the receiving means for imposing a force against the cards on that surface facing the transport means to obtain a transfer of such cards from the transport means to the receiving means.

21. In apparatus for processing data on a plurality of information storage cards, the combination of: transport means constructed to maintain the cards on the transport means and to obtain a movement of the cards, transducer means disposed in contiguous relationship to the transport means to obtain a transducing of information on the cards and constructed to provide an enhanced transducing action upon a disposition of the cards in abutting relationship to the transducer means, and means disposed externally of the transport means and disposed in separated relationship to the transducer means for imposing a force against the cards on the transport means to move the cards in abutting relationship with the transducer means during the imposition of the force and to return the cards to the transport means after the interruption in the imposition of the force.

22. In apparatus for processing data on a plurality of information storage cards, the combination of: transport means constructed to maintain the cards on the transport means and to obain a movement of the cards, receiving means constructed to receive cards from the transport means and disposed to face first surfaces of the cards on the transport means, means disposed externally of the transport means and in spaced relationship to the receiving means for imposing a fluid force against second surfaces of the cards opposite to the first surfaces to obtain a transfer of the cards from the transport means to the receiving means.

23. The combination set forth in claim 22 in which the receiving means are second transport means constructed to maintain the cards on the transport means and to obtain a movement of the cards.

24. In apparatus for processing data on a plurality of information storage cards, the combination of: transport means for the cards, a card holder constructed to hold the cards in stacked relationship, means disposed relative to the cards on the transport means for interrupting the movement of the cards at a position adjacent to the card holder to obtain a transfer of the cards from the transport means to the card holder, and means disposed externally of the transport means and in separated relationship to the receiving means for imposing a force against the cards on that surface facing the transport means to lift particular portions of the cards for facilitating the transfer of the cards from the transport means to the card holder.

25. In apparatus for processing data on a plurality of information storage cards, the combination of: transport means constructed to maintain the cards on the transport means and to obtain a movement of the cards, a card holder provided with first and second spaced walls and constructed to hold the cards in stacked relationship between the first and second walls, means disposed relative to the cards on the transport means at a position near the first wall of the card holder for obtaining a movement of the cards against the first wall for a transfer of the cards into the card holder, and pneumatic means disposed externally of the transport means and in physically spaced relationship to the transport means and the cards on the transport means at a position near the second wall of the transport means for exerting a pneumatic force against the trailing ends of the cards to facilitate a stacking of the cards in the card holder in the same order as the transport of the cards.

References Cited in the file of this patent

UNITED STATES PATENTS 2,101,268 Novick ---------------- Dec. 7, 1937